United States Patent Office 2,752,259
Patented June 26, 1956

2,752,259

MODIFIED HIGH ZIRCON REFRACTORY

Ralph L. Cook, Champaign, Ill., assignor to The University of Illinois Foundation, a non-profit corporation of Illinois No Drawing. Application August 4, 1951,
Serial No. 240,433

5 Claims. (Cl. 106—57)

This application relates to a refractory composition and a method of preparing same. The composition is primarily adapted for the lining of smelters to be used for the smelting of fritted glasses and, more particularly, in the smelting of porcelain enamel frits. Porcelain enamel frits are the essential component materials of porcelain enamel coatings. In the normal manufacturing process, porcelain enamel frits are fused or smelted in refractory-lined smelting furnaces, following which they are fritted or shattered by a quenching operation. These glasses not only have a rather high smelting temperature (around 2300° F.) but are highly erosive and corrosive. The ordinary refractory is very quickly corroded by the frit, and it is the purpose of this invention to provide a material which will withstand not only heat but corrosion. The refractory, however, may also be used in other situations where its resistance to erosion and corrosion are of value.

The refractories currently used in the smelting of porcelain enamels include (1) the clay type, in which kaolinite-containing materials such as kaolins, ball clays and fire clays are used, (2) the mullite type in which materials such as the previously mentioned clays, either raw or calcined, along with kyanite and other alumino-silicates are processed in a manner to obtain extensive mullite development in the fired refractory, (3) the alumina type in which materials such as diaspore or other alumina-rich materials are used to obtain refractories with a high corundum content (4) silica refractories in which ganister or other silica-rich material is used and (5) a zircon refractory, in which zircon is calcined to form a grog and then used with raw zircon (6) as well as special refractories such as fused, cast and electro-cast refractories. The commercial refractories vary from very porous loosely held grains to very dense low porosity products.

The present refractory relates to a material the chemical composition and method of preparation of which produces a low porosity, viz. a porosity of not more than 10% and generally from 0.5–3%, and gives a refractory material with superior corrosion and erosion resistance to porcelain enamel glasses and frits. The present refractory is prepared from zircon in combination with alkaline earth zirconium silicates and alumino silicates, which when fired, flux, react with, and combine with the zircon to form a resultant refractory brick or shape with low porosity and improved resistance to the attack of porcelain enamel frits or glasses in the smelting operation.

The term zircon has here been used to cover the commercial refractory-forming materials sold under that name. The particle size of the zircon should be below 100-mesh and preferably below 325-mesh.

Suitable fluxing agents are barium, calcium and magnesium oxides, carbonates, silicates or zirconium silicates. The compounds $BaO.ZrO_2.SiO_2$, $CaO.ZrO_2.SiO_2$, and $MgO.ZrO_2.SiO_2$ are particularly suitable.

Other fluxing agents include the alumino-silicates. The alumino-silicates found particularly suitable contained the mineral kaolinite, $Al_2O_3.2SiO_2.2H_2O$ and was added as kaolin, china clay, or ball clay. The clay not only served as a fluxing agent in the firing of the refractory but also as a bonding agent which was a decided advantage in forming the green unfired material. A mixture of several types of clay normally gives better results than one alone.

In the preparation of the raw materials, one-half of the desired batch is thoroughly mixed in a rotating muller type mixer similar to the Simpson mixer. Sufficient water is added (usually 4–10 percent) to obtain compaction of the powdered material. The powdered material is placed in refractory containers directly, or may be dry-pressed in the form of a brick, and calcined in a gas-fired furnace to a temperature of 2300–2500° F. The calcined mass is then broken in suitable crushers and grinders to obtain a gradation of particle sizes minus a 20-mesh screen and preferably minus a 40-mesh screen. The remaining portion of the raw batch is thoroughly mixed with the calcined portion in a rotating muller type mixer, and then sufficient water added, usually from 4–6 percent, to obtain a mix suitable for dry pressing. After suitable aging usually a minimum of 24 hours, standard nine-inch straight brick are dry-pressed in a hydraulic press at a controlled pressure of 5000 p. s. i.

Other variations were made in the preparation of the batch ingredients and in the pressing operation. Trials were made with all raw batch (no calcined batch), but increased trouble was encountered in pressing, as well as, greater shrinkage and more cracking in firing. In other trials the entire batch was calcined and the screened materials with 2.5 percent of dextrine, and sufficient water added for pressing. Intermediate trials were made and it was found that the best overall pressing characteristics could be obtained with a blend of 50 percent raw batch and 50 percent calcined batch prepared as aforementioned. The pressure used in forming was varied from 2000 p. s. i. to 7500 p. s. i. A forming pressure of 5000 p. s. i. gave very satisfactory results.

The refractory brick are fired in a gas-fired furnace to a temperature of at least 2700° F. and preferably from 2750°–2800° F. over a 24- to 28-hour period with a two hour soak at the peak temperature to obtain more uniform characteristics. During the firing treatment, the alkaline earth, zirconium silicates and clay react chemically with zircon and calcined portion of the batch to form a complex refractory.

The proportion of zircon* shown in compositions $a$ and $b$ in the following table is approximately the minimum. Both of these compositions contain a blend of 50% of various clays along with barium carbonate in one case and barium zirconium silicate in the other. Compositions $c$ and $d$ in the table contain 60 and 55 percent respectively, of zircon along with 25 and 10 percent of clays. Both compositions contain the alkaline earth zirconium silicates and $d$ is enriched with an addition of 15 percent of electrically fused zirconium oxide. Composition $e$ contains 70 percent zircon with equal proportions of alkaline earth zirconium silicates and clays. In compositions $f$ and $g$ the amount of zircon is increased to 80 percent and the total clay reduced to 10 and 5 percent respectively, the remainder being composed of alkaline earth zirconium silicates.

*Composition of zircon:

| $ZrO_2$ | $SiO_2$ | $TiO_2$ | $Fe_2O_3$ | $Al_2O_3$ | $CaO$ | $P_2O_5$ |
|---|---|---|---|---|---|---|
| 66.02 | 32.90 | 0.34 | 0.07 | 0.37 | 0.10 | 0.12 |

TABLE

*Refractory compositions*

| | a | b | c | d | e | f | g |
|---|---|---|---|---|---|---|---|
| Zircon "G" Grade, Milled | 25 | 25 | 60 | 55 | 70 | 80 | 80 |
| $BaCO_3$ | 25 | | | | | | |
| Tenn. No. 5 Ball Clay | 12.5 | 12.5 | 12.5 | 5 | 7.5 | 5 | 5 |
| Ky. O. M. No. 4 Ball Clay | 12.5 | 12.5 | 12.5 | 5 | 7.5 | 5 | |
| Fla. Kaolin | 12.5 | 12.5 | | | | | |
| Ga. Kaolin | 12.5 | 12.5 | | | | | |
| $BaO \cdot ZrO_2 \cdot SiO_2$ | | 25 | 7.5 | 10 | 5 | 5 | 5 |
| $CaO \cdot ZrO_2 \cdot SiO_2$ | | | 7.5 | 5 | 5 | | 5 |
| $MgO \cdot ZrO_2 \cdot SiO_2$ | | | | 5 | 5 | 5 | 5 |
| Elec. fused $ZrO_2$ | | | | 15 | | | |
| Firing Temp., °F | 2,650 | 2,600 | 2,600 | 2,760 | 2,800 | 2,900 | 2,900 |
| Percent Porosity | 1.8 | 1.1 | 1.5 | 0.5 | 1.0 | 1.5 | 1.0 |
| Percent Weight Loss, 48 Hour Rotary Slag Test | 20 | 20 | 17.0 | 16.8 | 10.5 | 10.0 | 10.0 |

The proportion of zircon shown in compositions *a* and *b* is approximately the minimum. The proportion of zircon shown in compositions *f* and *g* is approximately the maximum. Formula *e* is the preferred formula.

There is also shown in the table the firing temperature of each refractory, the percent apparent fired porosity after firing to the temperature given and the results of testing these refractories in a rotary slag test. The rotary slag furnace used is a modification of an earlier furnace by Hursh and Grigsby as reported in Univ. Illinois Bull. Circ. 17, 1928, and summarized in "Refractories," by F. H. Norton, McGraw-Hill Book Company, Inc., 1949, p. 459. In the rotary slag test, the refractory bricks are placed in ports in the wall of the furnace, the furnace heated to the operating temperature of 2150° F. ±25° F. by a rotating center burner in a period of twelve hours. After the preliminary heating period to the operating temperature, a mixture of previously prepared frit and raw batch is fed automatically from a hopper and auger feed to the hollow central burner tubes and thence blown against the surface of the refractories under test. The molten enamel glass runs over the surface of the refractories being tested. In the testing program, the material is fed continuously at the operating temperature for a 48-hour period. At the completion of a test, the refractories are cooled and the percent loss in weight determined due to erosion and corrosion of the molten enamel gloss.

The rotary slag test is used as an accelerated test to differentiate between the apparently good and poor refractories. To anyone skilled in the art it is recognized that the rotary slag test is not satisfactory to give a complete quantitative differentiation between the good refractories in even the 12-hour preheat and 48-hour operating period.

The refractories which showed good results in the rotary slag test were tested under service conditions in various commercial smelters. Materials produced according to this method and formula have been found, in actual practice to have an operating life remarkably superior to the prior art.

The term, "silicate" as used in the claims includes complex silicates such as the alkaline earth zirconium silicates shown in the table.

The foregoing detailed description is given for clearness of understanding only, and no unnecessary limitations should be understood therefrom, as modifications will be obvious to those skilled in the art.

I claim:

1. A refractory having a porosity of from 0.5 to 3%, a firing temperature of approximately 2600–2900° F. and about 70% zircon, 15% clay and 15% of an alkaline earth zirconium silicate.

2. A refractory having a porosity of from 0.5 to 3%, a firing temperature of approximately 2600–2900° F. and consisting essentially of 25–80% zircon, 5–50% clay and 10–25% of an alkaline earth zirconium silicate.

3. A refractory having a porosity of not more than 10%, a firing temperature of approximately 2600–2900° F. and consisting essentially of 25–80% zircon, 5–50% clay and up to 25% of an alkaline earth material.

4. The process which comprises mixing a batch consisting essentially of 25–80% zircon, 5–50% clay and up to 25% of an alkaline earth material and calcining the batch at 2600–2900° F. to produce a refractory having a porosity of not more than 10%.

5. The process of claim 4 in which the alkaline earth material is an alkaline earth zirconium silicate.

References Cited in the file of this patent

UNITED STATES PATENTS

| | | |
|---|---|---|
| 1,807,543 | Morgan | May 26, 1931 |
| 1,952,119 | Comstock | Mar. 27, 1934 |
| 1,952,120 | Comstock | Mar. 27, 1934 |
| 2,204,582 | Donahue | June 18, 1940 |
| 2,220,411 | Kinzie et al. | Nov. 5, 1940 |
| 2,220,412 | Kinzie et al. | Nov. 5, 1940 |
| 2,277,705 | Kinzie et al | Mar. 31, 1942 |
| 2,424,111 | Navias | July 15, 1947 |
| 2,454,121 | Baker et al. | Nov. 16, 1948 |
| 2,511,679 | Thiess | June 13, 1950 |
| 2,534,327 | Whitman | Dec. 19, 1950 |
| 2,534,328 | Whitman | Dec. 19, 1950 |
| 2,559,381 | Wainer | July 3, 1951 |